UNITED STATES PATENT OFFICE.

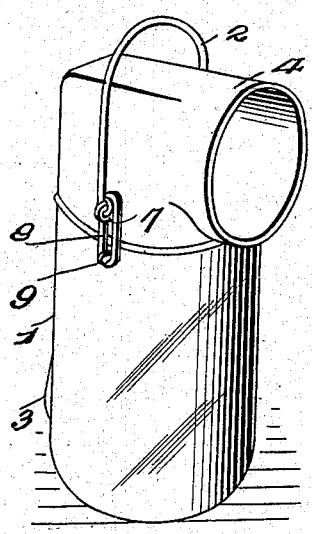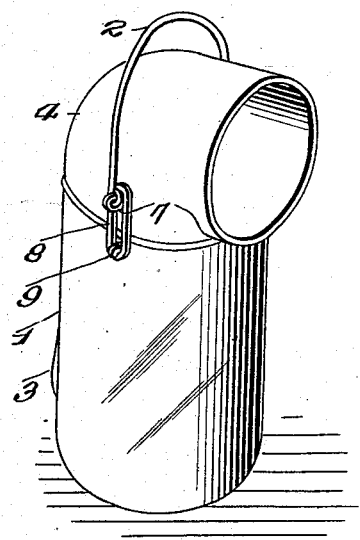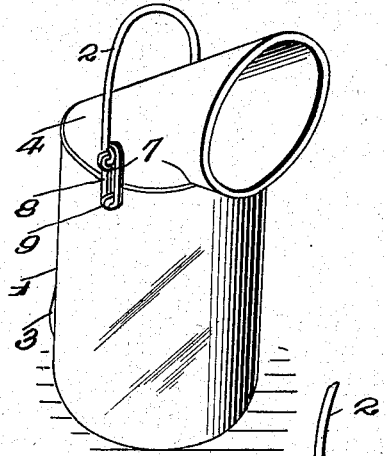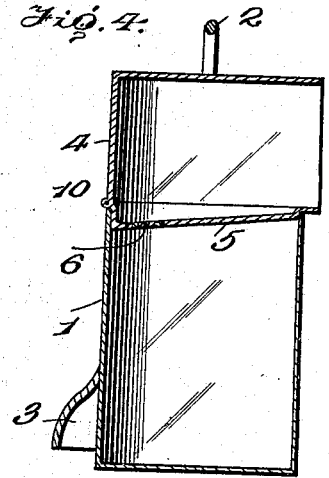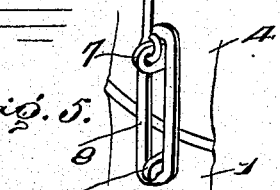

SAMUEL W. GERSTER, OF GERSTER, MISSOURI.

MILKING VESSEL.

No. 900,161.   Specification of Letters Patent.   Patented Oct. 6, 1908.

Application filed February 18, 1908. Serial No. 416,507.

*To all whom it may concern:*

Be it known that I, SAMUEL W. GERSTER, citizen of the United States, residing at Gerster, in the county of St. Clair and State of Missouri, have invented certain new and useful Improvements in Milking Vessels, of which the following is a specification.

The present invention provides a vessel specially designed for dairy use and particularly for receiving milk, the same being so formed as to prevent any dirt or foreign matter falling from above entering the receptacle and contaminating the milk, said receptacle being protected at its upper end and having a lateral opening through which the milk enters the receptacle during the milking operation.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of one form of receptacle embodying the invention. Fig. 2 is a similar view to Fig. 1 of a modification. Fig. 3 is a like view of a further modification. Fig. 4 is a vertical central section of the form shown in Fig. 1. Fig. 5 is a detail view showing more clearly the manner of connecting the bail to the top and both the bail and the top to the vessel.

Corresponding and like parts are referred to in the following description and indicated in all the views of the drawings by the same reference characters.

The vessel 1 may be a box or receptacle of any capacity or size and is provided with a bail 2 for convenience of handling and is supplied near its lower rear side with a hand hold 3 to be used in conjunction with the bail when pouring the milk from the vessel. The top 4 is approximately of elbow form and may be square, as shown in Fig. 1, round as illustrated in Fig. 2, or sloping as represented in Fig. 3. The vertical member of the top 4 is adapted to enter the upper end of the vessel 1 and fits within the same snugly. The horizontal or lateral member opens at one side of the vessel and may be in vertical line therewith or project slightly beyond said vertical line. The top 4 provides a closure for the vessel so as to prevent dirt or foreign matter entering the same from above whether falling from the hands or clothing of the operator or from any other object. During the milking operation, the vessel is placed so that the lacteal fluid may be directed into the open side of the top 4 which may be readily accomplished, thereby preventing solid matter dropping into the vessel from above or the operation of milking being interfered with by the switching movements of the cow, particularly during fly time. The vessel 1 and top 4 are preferably constructed of sheet metal.

An inclined bottom 5 is provided in the vertical member of the top 4 and inclines downwardly and rearwardly from the open side thereof and is provided at its inner rear end with an opening which is covered by means of a piece of wire gauze 6 forming a strainer which removes any solid matter that may perchance enter the open side of the top 4. The inward and rearward inclination of the bottom 5 gives proper direction to the milk as the same is directed through the open side of the top 4.

The bail 2 is attached to ears 7 applied to opposite sides of the top 4 and links 8 attached to said ears 7 are adapted to make connection with other ears 9 applied to the sides of the vessel 1 so as to aline with the ears 7. After the top 4 has been placed in position and the links 8 engaged with the ears 9, the vessel may be carried by means of the bail, as will be readily understood. To prevent casual displacement of the top 4, the latter is preferably hinged to the vessel 1, as shown at 10, thereby admitting of the top being thrown upward and backward when it is required to pour the milk from the vessel, or to gain access to the latter and to the top for cleaning or other like purpose.

Having thus described the invention, what is claimed as new is:

1. A milking vessel, a top therefor of approximately elbow form, an inclined bottom fitted within the vertical member of said top and having an opening at its lowest point covered by wire gauze or like material forming a strainer.

2. In combination, a vessel, ears at opposite sides of the vessel near the upper end thereof, a top removably fitted to said vessel, ears at opposite sides of the top, a bail having connection with the ears of said top, and
5 links fitted to the ears of the aforesaid top and adapted to make connection with the ears of the vessel.

In testimony whereof I affix my signature in presence of witnesses.

SAMUEL W. GERSTER.

Witnesses:
 Leslie Rodgers,
 Jas. R. Lucas,
 G. B. Dinney.